United States Patent [19]

Matolcsy et al.

[11] 3,892,747
[45] July 1, 1975

[54] TRIAZINE COMPOUNDS AND HERBICIDES CONTAINING THE SAME, AND A PROCESS FOR THE PREPARATION THEREOF

[75] Inventors: Gyorgy Matolcsy; Barna Bordas; Odon Szatala; Viktor Andriska, all of Budapest; Erzsebet Grega, nee Toth; Zoltan Pinter, both of Miskolc; Sandor Nagy, Putnok, all of Hungary

[73] Assignee: Eszakmagyarorszagi Vegyimuvek, Sajobabony, Hungary

[22] Filed: May 7, 1973

[21] Appl. No.: 357,721

[30] Foreign Application Priority Data

May 8, 1972   Hungary............................ 167

[52] U.S. Cl. ............... 260/249.8; 71/93; 260/249.5
[51] Int. Cl. ............................................ C07d 55/20
[58] Field of Search ................................. 260/249.8

[56] References Cited
UNITED STATES PATENTS

| | | | |
|---|---|---|---|
| 3,218,148 | 11/1965 | Knusli et al.................. | 260/249.8 X |
| 3,326,912 | 6/1967 | Yamamto et al................ | 260/249.8 |
| 3,326,914 | 6/1967 | Knusli et al..................... | 260/249.8 |

OTHER PUBLICATIONS

Smolin et al., "S–Triazines and Derivatives," pp. 292 to 305, Interscience Publishers Inc., N.Y., (1959).
Chemical Abstracts Fifth Decennial Index, Subjects Cy–Ey, p. 4078 s, (covering Vols. 41–50 of 1947–1956 period), (1960).

*Primary Examiner*—John D. Randolph
*Attorney, Agent, or Firm*—Young & Thompson

[57] ABSTRACT

2-Substituted-4-alkylamino-6-($\alpha,\alpha$-dimethyl-$\beta$-acetyl-ethylamino-1,3,5-triazines of the general formula (I)

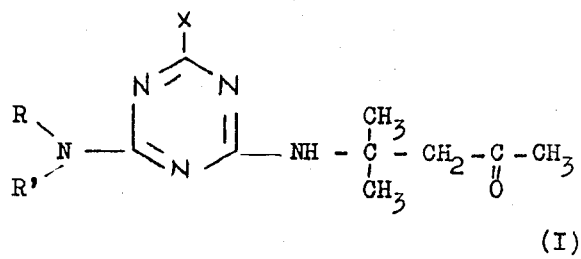

(I)

wherein
  X represents chlorine or a methylthio group,
  R represents hydrogen or a $C_{1-4}$ alkyl group, and
  R' stands for a $C_{1-4}$ alkyl or alkenyl group, of excellent herbicidal activities are prepared as follows: cyanurchloride is reacted with diacetonamine in a molar ratio of 1:1 in an aqueous or organic solvent medium in the presence of an acid binding agent, the thus-obtained 2,4-dichloro-6-($\alpha,\alpha$-dimethyl-$\beta$-acetyl-ethylamino)-1,3,5-triazine is reacted with an amine of the general formula NHRR' in the presence of an acid binding agent, and if a 2-methylthio compound is to be prepared, the thus-obtained 2-chloro-4-alkylamino-6-($\alpha,\alpha$-dimethyl-$\beta$-acetyl-ethylamino)-1,3,5-triazine is reacted with thiourea and the obtained product is methylated, or the 2-chloro compound is reacted with methylthiol.

1 Claim, No Drawings

NEW TRIAZINE COMPOUNDS AND HERBICIDES CONTAINING THE SAME, AND A PROCESS FOR THE PREPARATION THEREOF

This invention relates to new triazine compounds and to herbicides containing the same, as well as to a process for the preparation of said new compounds and herbicides.

The new 2-substituted-4-alkylamino-6-($\alpha,\alpha$-dimethyl-$\beta$-acetyl-ethylamino)-1,3,5-triazines according to the invention correspond to the general formula (I)

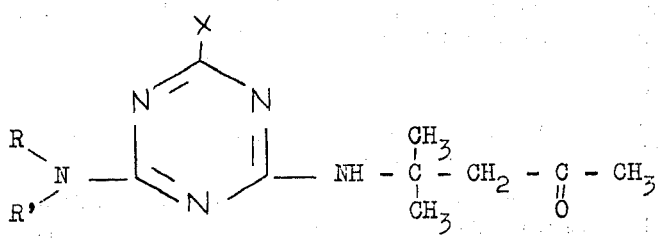

wherein
X represents chlorine atom or a methylthio group,
R represents hydrogen or a $C_{1-4}$ alkyl group, and
R' stands for a $C_{1-4}$ alkyl or alkenyl group.

The new compounds of the general formula (I), wherein X stands for chlorine and R and R' each have the same meanings as defined above can be prepared as follows: cyanurchloride is reacted with an equivalent amount of diacetonamine in the presence of an acid binding agent in an aqueous or organic solvent medium, and the thus-formed 2,4-dichloro-6-($\alpha,\alpha$-dimethyl-$\beta$-acetyl-ethylamino)-1,3,5-triazine is reacted directly, without any isolation step, with a substituted amine of the general formula NHRR' in the presence of an acid binding agent.

In the first step of the above synthesis diacetonamine can also be introduced in the form of its acid addition salt, such as in the form of oxalate, in this instance, however, a base, such as sodium hydroxide or sodium hydrocarbonate is also to be added to the reaction mixture in an amount equivalent to the anion of the salt.

Those compounds of the general formula (I), wherein X represents a methylthio group and R and R' each have the same meanings as defined above, can be prepared by reacting the corresponding 2-chloro-4-alkylamino-6-($\alpha,\alpha$-dimethyl-$\beta$-acetyl-ethylamino)-1,3,5-triazine obtained in the above synthesis with thiourea, and contacting the thus-formed 2-thio compound with a methylating agent. The 2-chloro derivatives can also be converted directly into the corresponding 2-methylthio compounds by reacting them with methylthiol.

We have found that the compounds of the general formula (I) possess herbicidal activities, and can be used for combatting or controlling weeds. In the literature there were already described some alkylamino-1,3,5-triazine derivatives of herbicidal effects, such as the 2-chloro and 2-methylthio-4,6-bis-alkylamino-1,3,5-triazine compounds, among which those sold under the trade names Atrazine and Symazine are widely used in the agriculture. The compounds of the general formula (I) have, however, several advantages over the known herbicidal agents of related structures. The new compounds according to the invention show selective phytotoxic activities, too, they field of activity, however, differs somewhat from that of the known ones. Namely, the new compounds show greater phytotoxic activities against several weeds than the known ones, and by the alternating use of the known and the new herbicidal agents the development of resistant plant varieties can be avoided and a more effective control of weeds can be ensured.

A further advantage of the new compounds is that they effect appears within a shorter period than that of the known herbicides of related structure. According to our experiments the effect of the new compounds having the general formula (I) can be observed even 4 days after the treatment, while using Symazine or Atrazine, the first symptoms appear only about 10 days after the treatment. This quick appearance of the effect can be attributed presumably to the presence of the keto group in the side chain, which, due to its proton acceptor character, takes place in the formation of hydrogen bonds.

The compounds of the general formula (I) can be converted to herbicidal preparations, such as sprays, powders, wettable powders, dusts, granules, etc., and are used by applying them in conventional ways to soil as well as to the foliage of weeds.

The rate and method of application, as well as the necessary amount of active agent depends on the effect to be attained. It is essential that the active agent should be uniformly distributed in the herbicidal preparations. An amount of 1 to 10 kg. of active agent pro ha. provides generally satisfactory results. The active agents can be applied onto the soil or plants preferably in the form of liquid sprays or powder dusts. The liquid sprays may be prepared directly at the place of application from emulsion concentrates or wettable powders by diluting them with water. The concentration of the active agent may amount to 0.01 to 5 % by weight in the final liquid sprays. The emulsion concentrates or wettable powders used for the preparation of liquid sprays contain carriers and dispersing and/or wetting agents besides the active ingredients. Among the carriers usable for the preparation of wettable powders e.g. silicic earth, talc, bentonite, chalk powder or chemical fertilizers are to be mentioned. The carriers are used for the preparation of herbicidal compositions in finely dispersed state.

The invention is elucidated in detail by the aid of the following non-limiting Examples.

EXAMPLE 1

2-Chloro-4-isopropylamino-6-($\alpha,\alpha$-dimethyl-$\beta$-acetyl-ethylamino)-1,3,5-triazine 18.4 g. (0.1 mol.) of cyanurchloride are added to 200 ml. of water with stirring and external cooling, at a temperature not exceeding 5°C, thereafter 11.5 g. (0.1 mol.) of diacetonamine and finally 4 g. (0.1 mol.) of sodium hydroxide (as a 10 % aqueous solution) are added to the mixture. During the addition the mixture is stirred and maintained at a temperature below 5°C. Stirring is continued for additional 0.5 hours, thereafter the temperature of the mixture is allowed to raise to room temperature. The mixture is stirred at room temperature for additional one hour, thereafter 13.1 ml. (0.1 mol.) of a 45 % aqueous isopropylamine solution and 4 g. (0.1 mol.) of sodium hydroxide (as a 10 % aqueous solution) are added to the stirred mixture. If necessary, the mixture is cooled during addition in order to maintain the temperature below 35°C. The obtained mixture is stirred for 3 hours at room temperature, the solids are collected by filtration, washed with water, and dried. 20.5 g. (72 %) of snow-white, crystalline 2-chloro-4-isopropylamino-6-($\alpha,\alpha$-dimethyl-$\beta$-acetyl-ethylamino)-1,3,5-triazine are obtained; m.p.: 105°–110°C. The product melts at 112°–113°C after recrystallization from isopropanol.

Analysis: Calculated: C, 50.5 %; H, 5.7 %; N, 24.6 %; Cl, 12.4 %. Found: C, 50.2 %; H, 5.6 %; N, 24.9 %; Cl, 12.04 %.

Similarly can be prepared the following compounds starting from cyanurchloride and the appropriate amine of the general formula NHRR'.

| X | R | R' | | Analysis found % | calcd. % | M.p.°C (solvent) | Yield % |
|---|---|---|---|---|---|---|---|
| Cl | H | CH₃ | N: Cl: | 29.9 13.7 | 29.5 13.7 | 105–107 (cyclo hexane) | 67 |
| Cl | H | allyl | Cl: | 12.9 | 12.5 | 124–126 (cyclo-hexane) | 70 |
| Cl | C₂H₅ | C₂H₅ | Cl: | 10.7 | 11.6 | (liquid) | 52 |
| Cl | C₃H₇ | C₃H₇ | Cl: | 12.4 | 10.8 | (liquid) | 77 |

EXAMPLE 2

2-Chloro-4-ethylamino-6-($\alpha,\alpha$-dimethyl-$\beta$-acetyle-thylamino)-1,3,5-triazine solution) are added to the stirred mixture. The mixture is stirred for additional 3 hours, thereafter the separated solids are collected by filtration, washed with water, and dried. 8.9 g. (66 %) of snow-white 2-chloro-4-ethylamino-6-($\alpha,\alpha$-dimethyl-$\beta$-acetyl-ethylamino)-

18.4 g. (0.1 mol.) of cyanurchloride are added to 200 ml. of water with stirring and external cooling, at a temperature not exceeding 5°C, thereafter 22.2 g. (0.1. mol.) of diacetonamine oxalate, and finally 12 g. (0.3 mol.) of sodium hydroxide (as a 20 % aqueous solution) are added to the mixture. The reaction mixture is left to warm to room temperature, thereafter 4.5 g. (0.1 mol.) of ethylamine (as an 50 % aqueous solution) and 4 g. (0.1 mol.) of sodium hydroxide (as a 10 % aqueous 1,3,5-triazine are obtained; m.p.: 122°–134°C. The product melts at 132°–134°C after recrystallization from a 1:1 mixture of methanol and water.

Analysis: Calculated: N, 25.8 %; Cl, 13.0 %. Found: N, 26.36 %; Cl, 12.96 %.

EXAMPLE 3

2-Methylthio-4-isopropylamino-6-($\alpha,\alpha$-dimethyl-$\beta$-acetyl-ethylamino)-1,3,5-triazine A mixture of 5.7 g. (0.02 mol.) of 2-chloro-4-isopropylamino-6-($\alpha,\alpha$-dimethyl-$\beta$-acetyl-ethylamino)-1,3,5-triazine (prepared as described in Example 1), 40 ml. of methanol and 3.1 g. (0.004 mol.) of thiourea is refluxed for 3 hours. The obtained apolar solution is left to cool, a solution of 1.6 g. (0.04 mol.) of sodium hydroxide in 3 ml. of water is added, and the mixture is refluxed again for 1 hour. Thereafter the mixture is cooled to 50°C, and 2.8 g. (0.022 mol.) of dimethylsulfate are added in small portions at a temperature of 55° to 60°C. When the addition is complete, the reaction mixture is refluxed for 1.5 hours, thereafter it is cooled. The solvent is decanted, and the resinous residue is washed with water and dried in air. 3.2 g. (52 %) of 2-methylthio-4-isopropylamino-6-($\alpha,\alpha$-dimethyl-$\beta$-acetyl-ethylamino)-1,3,5-triazine are obtained.

Analysis: Calculated: S, 11.83 %; Cl, 0 %. Found: S, 11.43 %; Cl, 0.7 %.

What we claim is:
1. A 2-substituted-4-alkylamino-6-($\alpha,\alpha$-dimethyl-$\beta$-acetyl-ethylamino)-1,3,5-triazine of the formula

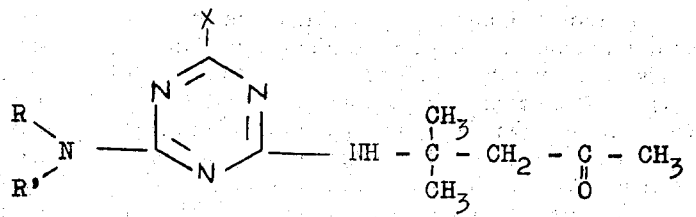

wherein
X represents chlorine or a methylthio group,
R represents hydrogen or a $C_{1-4}$ alkyl group, and
R' stands for a $C_{1-4}$ alkyl or alkenyl group.

* * * * *